(12) United States Patent
Chen et al.

(10) Patent No.: US 8,856,243 B2
(45) Date of Patent: Oct. 7, 2014

(54) METHOD, DEVICE, AND SYSTEM FOR MESSAGE DISTRIBUTION

(75) Inventors: Shengping Chen, Shenzhen (CN); Yimin Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 512 days.

(21) Appl. No.: 12/904,850

(22) Filed: Oct. 14, 2010

(65) Prior Publication Data

US 2011/0029631 A1  Feb. 3, 2011

Related U.S. Application Data

(63) Continuation of application No. PCT/CN2009/070711, filed on Mar. 10, 2009.

(30) Foreign Application Priority Data

Apr. 14, 2008 (CN) .......................... 2008 1 0027427

(51) Int. Cl.
*G06F 15/16* (2006.01)
*H04L 29/06* (2006.01)
*H04L 29/08* (2006.01)

(52) U.S. Cl.
CPC ............ *H04L 67/1027* (2013.01); *H04L 69/18* (2013.01); *H04L 67/1034* (2013.01); *H04L 67/141* (2013.01); *H04L 67/1002* (2013.01); *H04L 67/14* (2013.01)
USPC .......................................... 709/206; 709/204

(58) Field of Classification Search
CPC ............ H04L 67/1027; H04L 67/1002; H04L 67/1034; H04L 67/14; H04L 67/141; H04L 69/18
USPC ................. 709/204, 206; 379/93.01
See application file for complete search history.

(56) References Cited

U.S. PATENT DOCUMENTS 6,327,622 B1    12/2001  Jindal et al.
6,393,289 B1 *   5/2002  Bunting et al. ............... 455/445
(Continued)

FOREIGN PATENT DOCUMENTS

CN         1882123         12/2006
CN         1885969         12/2006
(Continued)

OTHER PUBLICATIONS

Office Action issued in corresponding Russian Application No. 2010146258, mailed Feb. 8, 2012.
(Continued)

*Primary Examiner* — Phuoc Nguyen
*Assistant Examiner* — Davoud Zand
(74) *Attorney, Agent, or Firm* — Brinks Gilson & Lione

(57) ABSTRACT

The disclosure relates to a message distribution method, device, and system. A message distribution method includes: creating a session based on a received first type of session message and allocating a corresponding cluster node to the session; and upon receiving a second type of session message associated with the session, distributing the second type of session message to the cluster node corresponding to the session. With the technical solution according to the embodiments of the invention, both the first type of session message and the second type of session message may be processed on the same cluster node, smooth and dynamic capacity expansion may be achieved for the cluster, the system performance may be enhanced, and system maintenance may be facilitated.

11 Claims, 4 Drawing Sheets

(56) References Cited

U.S. PATENT DOCUMENTS

| | | | |
|---|---|---|---|
| 7,653,734 B1 * | 1/2010 | Aho | 709/231 |
| 7,779,081 B2 * | 8/2010 | Hufferd | 709/212 |
| 7,941,690 B2 * | 5/2011 | Rao et al. | 714/4.1 |
| 2005/0073982 A1 | 4/2005 | Corneille et al. | |
| 2005/0281205 A1 | 12/2005 | Chandwadkar et al. | |
| 2006/0031328 A1 * | 2/2006 | Malik | 709/206 |
| 2006/0233106 A1 | 10/2006 | Achlioptas et al. | |
| 2007/0002834 A1 * | 1/2007 | Taylor | 370/352 |
| 2007/0121490 A1 * | 5/2007 | Iwakawa et al. | 370/218 |

FOREIGN PATENT DOCUMENTS

| | | |
|---|---|---|
| CN | 1965519 | 5/2007 |
| EP | 1189410 A2 | 3/2002 |
| KR | 20030062018 | 7/2003 |
| WO | WO 2009/127132 | 10/2009 |

OTHER PUBLICATIONS

Extended European Search Report issued in corresponding European Patent Application No. 09732873.6, mailed Mar. 21, 2011.

Written Opinion of the International Searching Authority issued in corresponding PCT Patent Application No. PCT/CN2009/070711, mailed Jun. 18, 2009.

Endrei et al., "IBM WebSphere V4.0 Advanced Edition: Scalability and Availability", ibm.com/redbooks. XP-002344068.

Office Action issued in corresponding Chinese Patent Application No. 200810027427.5, mailed Jun. 2, 2011.

Office Action issued in corresponding Indonesian Patent Application No. W 00201003544, mailed Nov. 23, 2011.

* cited by examiner

METHOD, DEVICE, AND SYSTEM FOR MESSAGE DISTRIBUTION

CROSS-REFERENCE TO RELATED APPLICATIONS

This application is a continuation of International Application No. PCT/CN2009/070711, filed on Mar. 10, 2009, which claims priority to Chinese Patent Application No. 200810027427.5, filed on Apr. 14, 2008, both of which are hereby incorporated by reference in their entireties.

FIELD OF THE INVENTION

The disclosure relates to the field of communications, and more particularly, to a method, device, and system for message distribution.

BACKGROUND

The Wireless Application Protocol (WAP) is a combination of a series of specifications similar to the Internet applications on the mobile network, to standardize wireless communication devices for Internet access, including email transmission and reception, WAP page browsing, etc. Currently, the WAP technology has become a global standard for mobile phones based on Global System for Mobile Communications (GSM), General Packet Radio Service (GPRS), Wideband Code Division Multiple Access (WCDMA), or the like, and other terminals to access wireless information services. WAP protocols mainly include the WAP1.X protocol and the WAP2.0 protocol.

A load balance cluster mechanism is applied in the current WAP system, where a User Information Database (UIDB) cluster and a WAP Gateway (WAP GW) cluster are deployed separately. For a session control message such as a Remote Authentication Dial in User Service (Radius) request message (e.g. Radius Req message), a GPRS Gateway Supporting Node (GGSN) transmits the Radius Req message to a certain cluster node of the UIDB cluster via a load balance (Load Balance, LB) device of the UIDB cluster. For a session traffic message such as a WAP request, the GGSN transmits the WAP request to a certain cluster node of the WAP GW cluster via an LB of the WAP GW cluster. The UIDB cluster is independent of the WAP GW cluster. The two clusters have separated and unrelated load balance policies. When the user of a handset attempts to access the network, a cluster node A of the WAP GW cluster searches a cluster node B of the UIDB cluster for the handset online and offline information based on the Internet Protocol (IP) address of the handset. According to the technical means provided in the prior art, the cluster node A determines a cluster node B on which the handset online and offline information is stored according to the remainder of dividing the last 4 bits of the IP address of the handset by the number of cluster nodes in the UIDB cluster (this technical means is also used when the handset online and offline information is being stored).

The mechanism in the prior art where the UIDB cluster and the WAP GW cluster are separately deployed, has defects as follows.

With the above technical means provided in the prior art, the session control information such as the handset online and offline information may be searched or the session traffic information may be searched. However, when the number of cluster nodes in the UIDB cluster or WAP GW cluster increases or decreases, it is hard to determine where the session control information or session traffic information is stored. Thus, smooth and dynamic capacity expansion is impossible for each cluster, the system performance is low, and maintenance is not convenient.

SUMMARY

The invention provides a message distribution method, device, and system in various embodiments. The session control message and the session traffic message may be transmitted to the same cluster node. Storage and retrieval of the session control information and the session traffic information may be achieved on the cluster node. Smooth and dynamic capacity expansion may be achieved for the cluster, the system performance may be enhanced, and system maintenance may be facilitated.

An embodiment of the invention provides a message distribution method, including:

creating a session based on a received type 1 session message, and allocating a corresponding cluster node to the session; and upon receiving a type 2 session message associated with the session, distributing the type 2 session message to the cluster node corresponding to the session.

Accordingly, an embodiment of the invention provides a load balance device, including:

a preprocessing unit, configured to create a session based on a received type 1 session message and allocate a corresponding cluster node to the session; and a distribution unit, configured to: upon receiving a type 2 session message associated with the session, distribute the type 2 session message to the cluster node corresponding to the session.

Accordingly, an embodiment of the invention provides a cluster node device, including a Wireless Application Protocol (WAP) Gateway (GW) and a corresponding user information database (UIDB).

The UIDB is configured to receive a control session message and store the control session information in the control session message.

The WAP GW is configured to receive a traffic session message, search for the control session information in the UIDB based on the traffic session message, and process the traffic session message based on the session control information.

Accordingly, an embodiment of the invention provides a load balance system, including a load balance device and a cluster node device.

The load balance device is configured to create a session based on a received type 1 session message, allocate a corresponding cluster node to the session, and upon receiving a type 2 session message associated with the session, distribute the type 2 session message to the cluster node device corresponding to the session.

The cluster node device is configured to receive a type 1 session message and a type 2 session message, the type 1 session message being a session control message and the type 2 session message being a session traffic message, or the type 1 session message being a session traffic message and the type 2 session message being a session control message; store the session control information in the session control message; and process the session traffic message based on the session control information.

In the embodiments of the invention, a session is created based on a received first type of session message and a corresponding cluster node is allocated to the session; when a second type of session message associated with the session is received, the second type of session message is distributed to the cluster node corresponding to the session. Therefore, the session control message and the session traffic message may be transmitted to the same cluster node. Storage and retrieval of the session control information and the session traffic information may be achieved on the cluster node. Smooth and dynamic capacity expansion may be achieved for the cluster, the system performance may be enhanced, and system maintenance may be facilitated.

DETAILED DESCRIPTION

The disclosure provides a message distribution method, an information retrieval method, and the corresponding device and system. Two different types of messages (such as the session control message and the session traffic message) may be transmitted to the same cluster node. Storage and retrieval of the session control information and the session traffic information may be achieved on the same cluster node. Smooth and dynamic capacity expansion may be achieved for the cluster, the system performance may be enhanced, and system maintenance may be facilitated.

Detailed descriptions will be made below to the embodiments of the invention with reference to the accompanying drawings.

Figure 1:
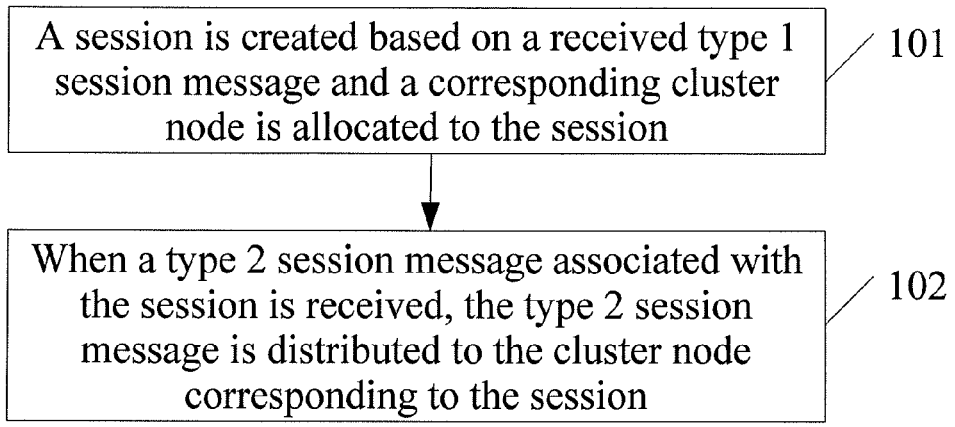
FIG. 1 is a flow chart showing a message distribution method according to an embodiment of the invention.

FIG. 1 is a flow chart showing a message distribution method according to an embodiment of the invention. Referring to the FIG. 1, the method includes steps as follows.

In step 101, a session is created based on a received first type of session message and a corresponding cluster node is allocated to the session.

When a session is being created, a first ID may be extracted as a key word from the first type of session message, the session is created by using the key word, and the session is held. The key word may be the IP address or the number of a terminal transmitting or receiving the first type of session message. For example, when the first type of session message is received from the GGSN, the IP address or the number of the terminal transmitting the first type of session message may be used as the key word. When the first type of session message is received from a cluster node, the IP address or the number of the terminal receiving the first type of session message may be used as the key word.

Allocation of a cluster node to the session may depend on the load, the operation status, or the like of the cluster node. If the first type of session message is received from a cluster node, the cluster node may be allocated to the session.

In step 102, when a second type of session message associated with the session is received, the second type of session message is distributed to the cluster node corresponding to the session.

When determining whether the second type of session message is associated with the session, a second ID may be extracted from the second type of session message to determine whether the second ID is same as the key word for creating the session. If the second ID is same as the key word, the second type of session message is associated with the session. The second ID may be the IP address or the number of a terminal transmitting or receiving the second type of session message. When the key word for creating the session (i.e., the first ID) is the number of the terminal and the second ID is the IP address of the terminal, step 101 may further involve the following operations. A third ID is extracted from the first type of session message, and a correspondence relationship is established between the third ID and the first ID, the third ID being the IP address of the terminal. When determining whether the second type of session message is associated with the session, the relationship is first searched based on the second ID, to find the terminal number corresponding to the second ID. Then, matching is performed based on the found terminal number and the key word for creating the session (i.e., the terminal number). If they are the same, the second type of session message is associated with the session.

In the above embodiment, the session messages (such as an IP message) may be of different types, for example, may be divided into the session control message and the session traffic message. The first type of session message is a session control message and the second type of session message is a session traffic message, or the first type of session message is a session traffic message and the second type of session message is a session control message. For example, the session control message may be a Remote Authentication Dial in User Service (Radius) message among the User Datagram Protocol (UDP) messages, and the session traffic message may be a non-Radius message among UDP message or a Transfer Control Protocol (TCP) message.

In the above embodiment, a session is held, a corresponding cluster node is allocated to the session, and different types of session messages may be distributed to the cluster node corresponding to the session based on the association between the different types of session messages and the session. Storage and retrieval of different types of session information thus may be achieved on the same cluster node. Different types of session information may be obtained more easily, and different types of session information may be distributed in a balanced manner. Smooth and dynamic capacity expansion may be achieved for the cluster, the system performance may be enhanced, and system maintenance may be facilitated. Furthermore, the first type of session message and the second type of message from the same user may be distributed to the same cluster node. Thus, user-based load balance may be achieved, and hence user-based traffic control and billing management may be achieved.

Figure 2:
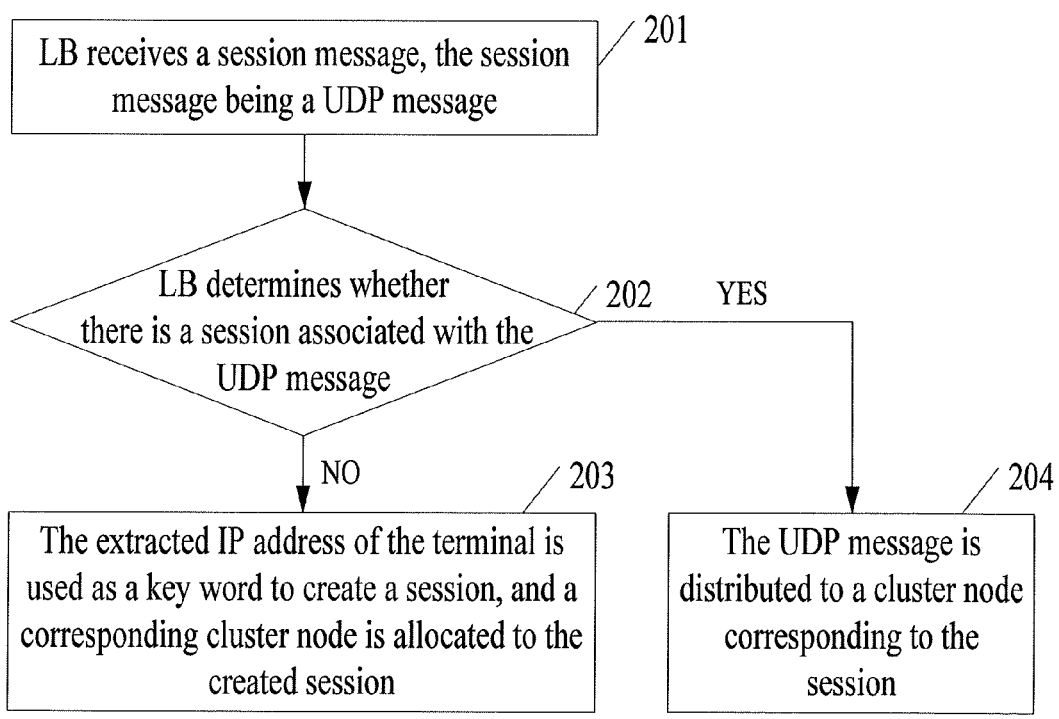
FIG. 2 is a specific flow chart showing step 102 of the message distribution method shown in FIG. 1 according to an embodiment of the invention.

In the following exemplary description to step 102, a UDP message (the protocol number of the IP message being 17 indicates a UDP message) is used and the IP address of the Mobile Station (MS) is used as the key word of the session. As shown in FIG. 2, the following steps are included.

201: The LB receives a session message, the session message being a UDP message.

202: The LB determines whether there is a session associated with the UDP message. If there is no such a session, step 203 is performed; if there is such a session, step 204 is performed.

First, the LB analyzes whether the server port number of the UDP message is a Radius serving port (1813 or 1812), in other words, determines whether the received UDP message is a Radius message (a kind of session control message, including session control information, for example, the MS online and offline information or the like). Two cases may be included.

Case A: If it is a Radius serving port, the received UDP message is a Radius message, i.e., a session control message.

The LB extracts a Frame-IP-Address (i.e., the IP of the MS) from the Radius message. Since the source IP of the Radius message is not the IP of the MS, but the IP of the Authentication Authorization Accounting (AAA) or the GGSN, therefore, the extracted ID is the Frame-IP-Address. The Frame-IP-Address in the Radius message is the IP of the MS (the source IP of the non-Radius message among UDP messages or the TCP message mentioned below is the IP of the MS).

Case B: If it is not a Radius serving port, the received UDP message is a non-Radius message among UDP messages.

The LB extracts a source IP from the UDP message. The UDP message is transmitted by the MS, and thus the source IP of the UDP message is the IP of the MS.

The LB determines whether there is a session having a key word same as the extracted Frame-IP-Address or source IP (i.e., the IP of the MS). If there is such a session, the UDP message is associated with the session. If there is no such a session, there is no session associated with the UDP message.

203: The extracted IP address of the MS is used as a key word to create a session, and a corresponding cluster node is allocated to the created session. The process of creating the session also may include two cases.

If the server port number of the UDP message is a Radius serving port, the LB uses the Frame-IP-Address extracted in Case A directly as a key word to create a session and holds the session. A timeout period may be set for the session, and a cluster node is selected in a balanced manner, and the cluster node is allocated to the created session. The Radius message is transmitted to the cluster node. In this way, a subsequent IP message having IP same as the MS may be transmitted to this cluster node during the session. Depending on the timeout period of the session, when the current session expires, a new session may be recreated for the subsequent IP message in this manner and a new cluster node may be reselected.

If the server port number of the UDP message is not a Radius serving port, the LB uses the source IP extracted in Case B directly as a key word to create a session and holds the session. A cluster node is selected in a balanced manner, and the cluster node is allocated to the created session. The UDP message is transmitted to the cluster node. In this way, a subsequent IP message having IP same as the MS may be transmitted to this cluster node during the session.

204: The UDP message is distributed to the cluster node corresponding to the session.

Description is made to the above embodiment by taking the UDP message as an example. When the session message received by the LB is a TCP message, i.e., a session traffic message, the process is similar to the process for the non-Radius message among the UDP message.

In an implementation, when the session message is a Radius message, the LB may first extract the Frame-IP-Address and the Mobile Station International Subscriber Directory Number (MSISDN) (i.e., the Calling-Station-ID therein). After a correspondence relationship is established between the Frame-IP-Address and the Calling-Station-ID (for example, a hash table having the Frame-IP-Address as the key word and having the Calling-Station-ID as its value), the Calling-Station-ID may be taken as the key word to create a session corresponding to a cluster node, and the session is held. When the LB receives a session message of another type from the MS (e.g. the application layer is not a Radius message), the source IP is extracted from the session message. Based on the correspondence relationship between Frame-IP-Address and Calling-Station-ID, a Calling-Station-ID corresponding to the source IP is searched for, and it is determined whether the found Calling-Station-ID is same as the key word (i.e., the Calling-Station-ID) for creating a session. If they are same, the session message is associated with the session, and the session message is transmitted to the cluster node corresponding to the session. If they are different, the session message is discarded.

In an implementation, when the LB determines that the session message is associated with a session, LB may further detect the operation status of the cluster node corresponding to the session. Upon detection that the cluster node corresponding to the session has a fault, another session may be created based on the session message and another non-fault cluster node may be allocated to the session. The session message is transmitted to the non-fault cluster node. The details may refer to the above description and thus no repetition is made here.

In an implementation, when a cluster node receives the session message, the session information in the session message (such as the session control information or the session traffic information) is recorded locally. When the LB transmits the above session message to a cluster node, it may also transmit the above session message to a backup node. The session information in the session message is backed up on the backup node for subsequent local information retrieval on the cluster node. Specifically, the session control information may be the terminal online and offline information.

Figure 3:
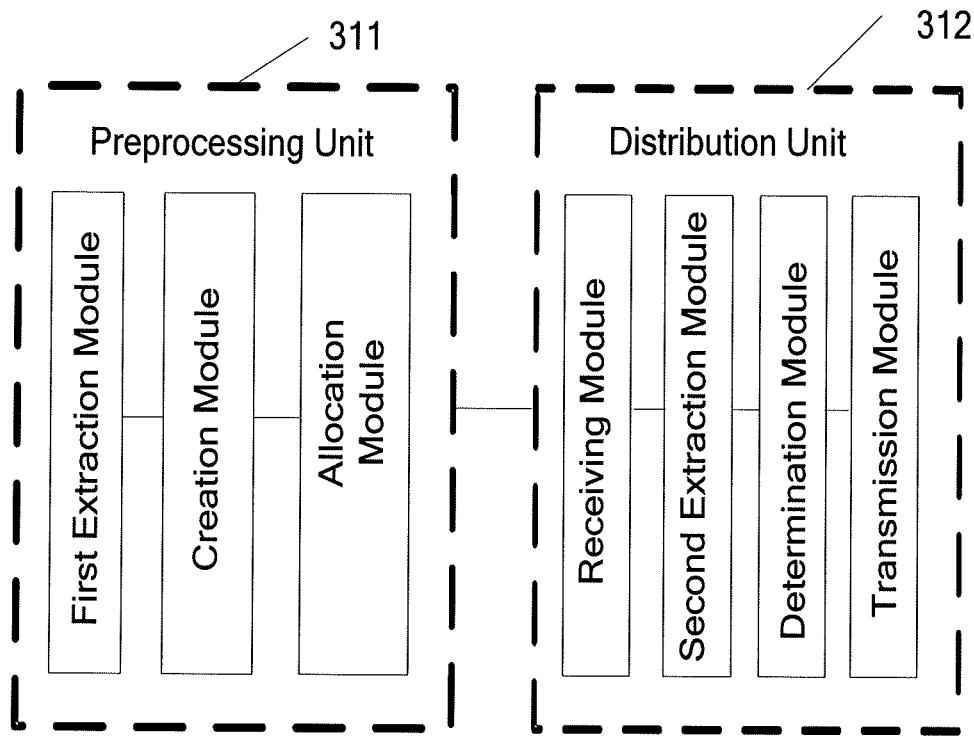
FIG. 3 is a block diagram showing a load balance device according to an embodiment of the invention.

FIG. 3 is a block diagram showing a load balance device according to an embodiment of the invention. The load balance device is connected to several cluster node devices. The load balance device includes a preprocessing unit 311 and a distribution unit 312.

The preprocessing unit 311 is configured to create a session based on a received first type of session message and allocate a corresponding cluster node device to the session. Specifically, when a session is being created, a first ID may be extracted from the first type of session message as the key word, the key word is used to create the session, and the session is held. Accordingly, the preprocessing unit 311 may further include a first extraction module, configured to extract a first ID from the first type of session message; a creation module, configured to create the session by using the first ID as a key word, and hold the session; and an allocation module, configured to allocate a corresponding cluster node to the session. The key word may be the IP address or the number of a terminal transmitting or receiving the first type of session message. For example, when the first type of session message is received from the GGSN, the IP address or the number of the terminal transmitting the first type of session message may be used as the key word. When the first type of session message is received from a cluster node device, the IP address or the number of the terminal receiving the first type of session message may be used as the key word. Allocation of a cluster node to the session by the allocation module may depend on the load, the operation status, or the like of the cluster node device. If the received first type of session message is transmitted from a cluster node device, the cluster node device may be allocated to the session.

The distribution unit 312 is configured to: upon receiving a second type of session message associated with the session, distribute the second type of session message to the cluster node device corresponding to the session. When determining whether the second type of session message is associated with the session, a second ID may be extracted from the second type of session message to determine whether the second ID is same as the key word for creating the session. If the second ID is same as the key word, the second type of session message is associated with the session. Accordingly, the distribution unit 312 may further include a receiving module, configured to receive a second type of session message; a second extraction module, configured to extract a second ID from the second type of session message; a determination module, configured to determine whether the second ID is same as the key word for creating the session, the second type of session message being associated with the session if the second ID is same as the key word; and a transmission module, configured to distribute the second type of session message associated with the session to the cluster node corresponding to the session when the determination module determines that the second type of session message is associated with the session. Here, the second ID may be the IP address or the number of a terminal transmitting or receiving the second type of session message. In the above embodiment, both the first ID and the second ID are the IP address of the terminal or the number of the terminal.

Figure 4:
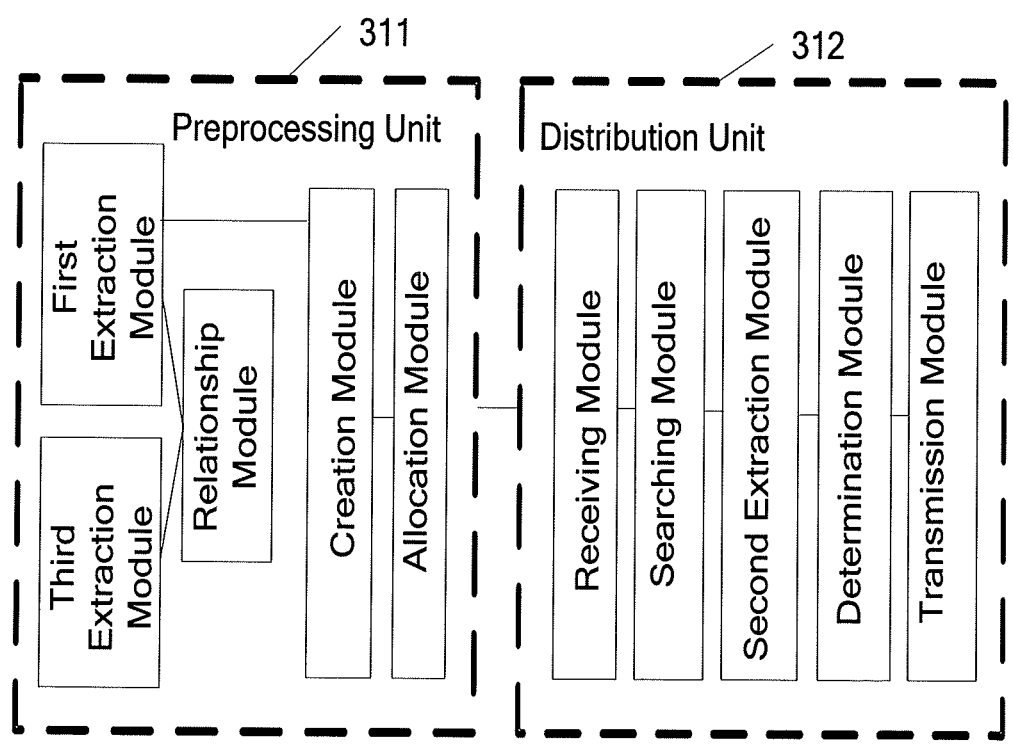
FIG. 4 is another block diagram showing a load balance device according to an embodiment of the invention.

When the key word for creating the session (i.e., the first ID) is the number of the terminal and the second ID is the IP address of the terminal, the preprocessing unit 311 should also extract a third ID from the first type of session, and establish a correspondence relationship between the third ID and the first ID, the third ID being the IP address of the terminal. When determining whether the second type of session message is associated with the session, the relationship is first searched based on the second ID, to find the terminal number corresponding to the second ID. Then, matching is performed based on the found terminal number and the key word for creating the session (i.e., the terminal number). If they are same, the second type of session message is associated with the session. Therefore, the block diagram of the load balance device in this embodiment is shown in FIG. 4. The preprocessing unit may also include a third extraction module, configured to extract a third ID from the first type of session message, the third ID being the IP address of a terminal transmitting or receiving the first type of session message; and a relationship module, configured to create a correspondence relationship between the IP address of the terminal transmitting or receiving the first type of message and the terminal number. The distribution unit may further include a receiving module, configured to receive a second type of session message; a second extraction module, configured to extract a second ID from the second type of session message; a searching module, configured to: based on the relationship in the correspondence module, search for a terminal number corresponding to the second ID; a determination module, configured to determine whether the found terminal number is same as the key word for creating the session, the second type of session message being associated with the session if the terminal number is same as the key word; and a transmission module, configured to distribute the second type of session message associated with the session to the cluster node corresponding to the session when the determination module determines that the second type of session message is associated with the session.

In the above embodiment, the session messages (such as an IP message) may be of different types, for example, may be divided into the session control message and the session traffic message. The first type of session message is a session control message and the second type of session message is a session traffic message, or the first type of session message is a session traffic message and the second type of session message is a session control message.

In the above embodiment, the preprocessing unit 311 holds a session and allocates a corresponding cluster node device to the session. Then, the distribution unit 312 may distribute different types of session messages to the cluster node device corresponding to the session based on the association between the different types of session messages and the session. Storage and retrieval of different types of session information may be achieved on the same cluster node device. Different types of session information may be obtained easily, and different types of session information may be distributed in a balanced manner. Smooth and dynamic capacity expansion may be achieved for the cluster, the system performance may be enhanced, and system maintenance may be facilitated.

Detailed descriptions will be given below to the preprocessing unit 311 and the distribution unit 312 of the load balance device. In the following description, for example, the session message is a User Datagram Protocol (UDP) message (the protocol number of the IP message being 17 indicates a UDP message) and the IP address of the MS is the key word of the session.

After the receiving module receives the UDP message, the second extraction module extracts a second ID from the UDP message. When the server port number of the UDP message is a Radius serving port (that is, the UDP message is a Radius message), the second extraction module extracts a Frame-IP-Address (i.e., the IP of the MS) from it. When the server port number of the UDP message is not a Radius serving port (that is, the UDP message is a non-Radius message), the second extraction module extracts a source IP (i.e., the IP of the MS) from it. Afterwards, the determination module determines whether there is a session having a key word same as the extracted Frame-IP-Address or source IP (i.e., the IP of the MS). If there is such a session, the UDP message is associated with the session, and the transmission module distributes the UDP message to the cluster node device corresponding to the session. If there is no such a session, there is no session associated with the UDP message, and the first extraction module extracts the Frame-IP-Address or the source IP (i.e., the IP of the MS) from the UDP message based on the type of the UDP message. The creation module uses the extracted IP address of the MS as a key word to create a session, and a corresponding cluster node device is allocated to the created session. A timeout period may be set for the session. When the current session expires, a new session may be recreated for a subsequent IP message in this manner and a new cluster node device may be reselected.

Furthermore, when the session message received by the load balance device is a TCP message (i.e., a session traffic message), the process is similar to the process for a non-Radius message among UDP message In an embodiment, when the creation module creates the session by using the number of the MS as the key word and holds the session (i.e., the first ID extracted by the first extraction module is the Calling-Station-ID in the session message), the third extraction module extracts the Frame-IP-Address from the session message. The relationship module establishes a correspondence relationship between the Frame-IP-Address and the Calling-Station-ID (for example, a hash table having the Frame-IP-Address as the key word and having the Calling-Station-ID as its value). When the receiving module receives a session message of another type from the MS (e.g. the application layer is not a Radius message), the second extraction module extracts the source IP from the session message. Based on the relationship between Frame-IP-Address and Calling-Station-ID, the searching module searches for a Calling-Station-ID corresponding to the source IP, and the determination module determines whether the Calling-Station-ID found by the searching module is same as the key word (i.e., the Calling-Station-ID) for creating a session. If they are same, the session message is associated with the session, and the transmission module transmits the session message to the cluster node device corresponding to the session.

In an embodiment, the load balance device may also include a fault detection unit. When the above determination module determines that the session message is associated with a session, the fault detection unit detects the operation status of the cluster node device corresponding to the session. Upon detection that the cluster node device corresponding to the session has a fault, the preprocessing unit 311 may be triggered to create another session based on the session message and allocate another non-fault cluster node device to the session. Details may refer to the above description and thus no repetition is made here.

In an embodiment, the load balance device may also include a backup unit. The above session message is transmitted to a backup node device, and the session control information or the session traffic information in the session message is backed up on the backup node device for subsequent information retrieval. Specifically, the session control information may be the terminal online and offline information.

Figure 5:
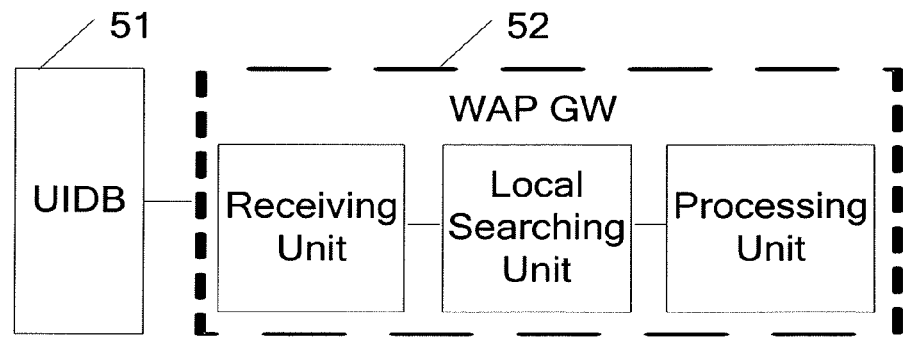
FIG. 5 is a block diagram showing a cluster node device according to an embodiment of the invention.

FIG. 5 is a block diagram showing a cluster node device according to an embodiment of the invention. Referring to the figure, the cluster node device includes a user information database (UIDB) 51 and a corresponding WAP GW 52.

UIDB 51 performs a session control process on a session and stores the session control information for the session, such as the terminal online and offline information. WAP GW 52 performs a session traffic process on the same session processed by UIDB 51. When WAP GW 52 searches for the session control information of the session, WAP GW 52 transmits a search request for the session control information to UIDB 51 and receives the session control information in a response from UIDB 51.

In an embodiment, WAP GW 52 may include a receiving unit, configured to receive a traffic session message; a local searching unit, configured to transmit a search request for the control session information to UIDB 51 and receive session control information in a response from UIDB 51; and a processing unit, configured to process the traffic session message based on the found control session information. WAP GW 52 also may include an external searching unit, configured to: when the local searching unit transmits a search request for the session control information to UIDB 51 and receives a response indicating that no session control information is found, search for the control session information of the session backed up on a backup node device outside the cluster node device.

It is to be noted that UIDB 51 and WAP GW 52 may be provided separately on different physical devices or may be provided on the same physical device.

According to the above embodiments, retrieval of different types of session information may be achieved on the same cluster node device so that different types of session information may be obtained conveniently.

Figure 6:
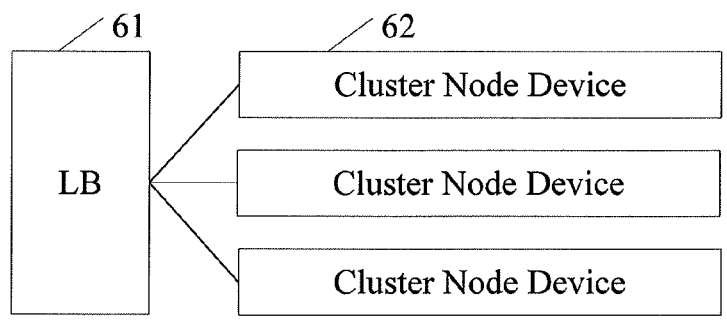
FIG. 6 is a block diagram showing a load balance system according to an embodiment of the invention.

FIG. 6 is a block diagram showing a load balance system according to an embodiment of the invention. Referring to the figure, the system mainly includes a load balance device 61 and a plurality of cluster node devices 62. The plurality of cluster node devices may form a cluster.

The load balance device 61 is configured to create a session based on a first received type of session message, allocate a corresponding cluster node device to the session, and upon receiving a second type of session message associated with the session, distribute the second type of session message to a cluster node device corresponding to the session.

The cluster node device 62 is configured to perform a first type of session process on the session based on the received first type of session message and perform a second type of session process on the session based on the received second type of session message. For example, when the first type of session message is a session traffic message, the cluster node device 62 performs a session traffic process based on the received session traffic message, and when the second type of session message is a session control message, the cluster node device 62 performs a session control process based on the received session control message.

Descriptions will be made below to two application scenarios of the above embodiment of the invention.

Figure 7:
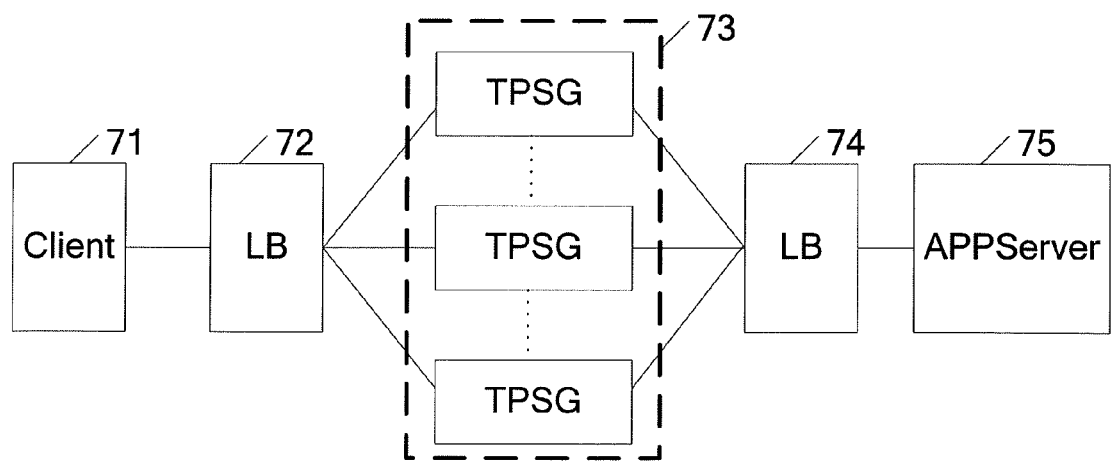
FIG. 7 is a block diagram showing a load balance system in the proxy mode according to an embodiment of the invention.

FIG. 7 is a block diagram showing a load balance system in the proxy mode according to an embodiment of the invention. Referring to the figure, the system includes a Client 71, an LB 72, a Transparent Proxy Service Gateway (TPSG) cluster 73 (not limited to the number as depicted), an LB 74, and an Application Server (APPServer) 75. The LB 72, the LB 74, and the TPSG cluster 73 are transparent to the Client 71 and APPServer 75. Client 71 is connected to LB 72. LB 72 and LB 74 are connected to the same cluster 73. LB 74 is connected with APPServer 75. The function of each device is as follows.

(1) Client 71 transmits a UDP message to APPServer 75

Specifically, Client 71 transmits a UDP message to LB 72.

Upon receipt of the UDP message transmitted from Client 71, LB 72 extracts a second ID from the UDP message. When the server port number of the UDP message is a Radius serving port (i.e., the UDP message is a Radius message), a Frame-IP-Address (i.e., the IP of the MS) is extracted from it. When the server port number of the UDP message is not a Radius serving port (that is, the UDP message is a non-Radius message), a source IP (i.e., the IP of the MS) is extracted from it. Afterwards, since LB 72 has created a session by taking the IP of the MS in the previously received session message as the key word and held the session, LB 72 determines whether there is a session having a key word same as the extracted Frame-IP-Address or source IP (i.e., the IP of the MS). If there is such a session, the UDP message is associated with the session, and LB 72 distributes the UDP message to the TPSG corresponding to the session. If there is no session associated with the UDP message, LB 72 extracts the Frame-IP-Address or source IP (i.e., the IP of the MS) from the UDP message based on the type of the UDP message. The extracted IP address of the MS is used as a key word to create a session, and a corresponding TPSG is allocated to the created session. A timeout period may be set for the session. When the current session expires, a new session may be recreated for a subsequent IP message in this manner and a new TPSG may be reselected.

After a TPSG in the TPSG cluster 73 corresponding to the above session receives the UDP message, the UDP message is transmitted to LB 74.

Upon receipt of the UDP message transmitted from the TPSG, when the UDP message is a Radius message, LB 74 extracts the Frame-IP-Address from the UDP message (i.e., the IP of Client 71), extracts the MAC address of the last hop from the UDP message (i.e., the MAC address of the TPSG transmitting the UDP message), and establishes a correspondence relationship between the Frame-IP-Address and the MAC address (for example, a hash table having the Frame- IP-Address as the key word and having the Calling-Station-ID as its value). Afterwards, LB 74 transmits the UDP message to APPServer 75.

APPServer 75 receives the UDP message and performs a corresponding process.

(2) After APPServer 75 receives the UDP message and performs a corresponding process, APPServer 75 returns the UDP message to Client 71.

Specifically, APPServer 75 returns the UDP message to LB 74.

Upon receipt of the UDP message returned from APPServer 75, LB 74 extracts a second ID from the UDP message and extracts the destination IP from it (i.e., the IP of the MS). Afterwards, LB 74 determines whether there is a session having a key word same as the extracted destination IP. If there is such a session, the UDP message is associated with the session, and then LB 74 searches the relationship between the Frame-IP-Address and the MAC address, finds the MAC address of the TPSG corresponding to the destination IP, and distributes the UDP message to the TPSG corresponding to the MAC address (that is, the TPSG receiving and transmitting the UDP message in the above case (1)). If there is no such a session, there is no session associated with the UDP message and LB 74 discards the UDP message.

After the TPSG in the TPSG cluster 73 corresponding to the above session receives the UDP message, the UDP message is transmitted to LB 72.

After LB 72 receives the UDP message transmitted from the TPSG, the UDP message is transmitted to Client 71 corresponding to the destination IP.

In the above embodiment, a session is held in two directions (the direction from Client 71 to APPServer 75 and the direction from APPServer 75 to Client 71), and a corresponding cluster node device is allocated to the session. Based on the association between different types of session messages and the session, different types of session messages may be distributed to the cluster node device corresponding to the session for forwarding. Processing different types of session information may be achieved on the same cluster node device. Different types of session information may be distributed in a balanced manner. Smooth and dynamic capacity expansion may be achieved for the cluster, the system performance may be enhanced, and system maintenance may be facilitated. Furthermore, the first type of session message and the second type of message from the same user may be distributed to the same cluster node. Thus, user-based load balance may be achieved, and accordingly user-based traffic control and billing management may be achieved.

Figure 8:
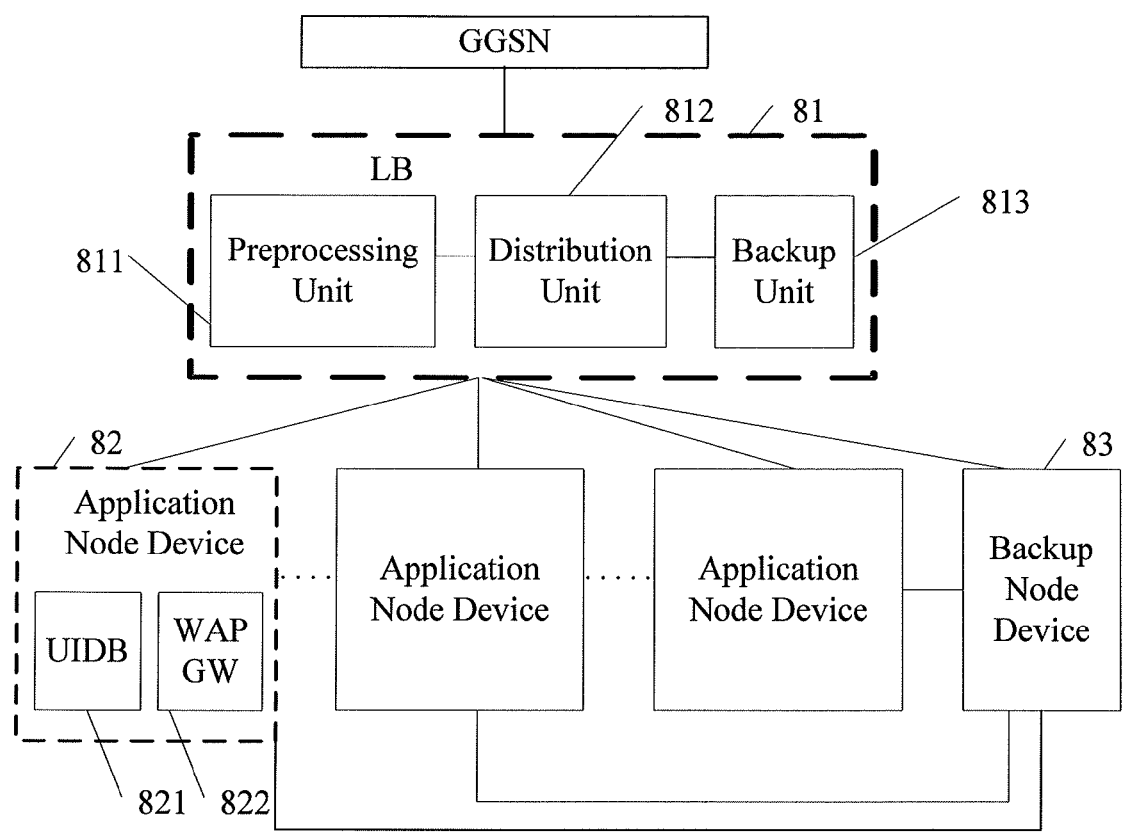
FIG. 8 is a block diagram showing a load balance system in the server mode according to an embodiment of the invention.

FIG. 8 is a block diagram showing a load balance system in the server mode according to an embodiment of the invention. The system includes an LB 81, application node devices 82, and a backup node device 83. LB 81 is connected to several application node devices in the application node device cluster. LB 81 includes a preprocessing unit 811, a distribution unit 812, and a backup unit 813. Each application node device 82 has a UIDB 821 for performing session control process on the session and a WAP GW 822 for performing session traffic process on the same session processed by the UIDB 821. The number of backup node devices may be determined according to practical requirements. In this example, there is one backup node device. Referring to the FIG. 8, the devices and functional units of the system are as follows.

The preprocessing unit 811 is configured to create a session based on a received Radius message and allocate a corresponding application node device to the session. Specifically, the IP of the MS in the previously received Radius message may be used as a key word to create the session and the session may be held. After the distribution unit 812 receives a UDP message routed from the GGSN, a second ID is extracted from the UDP message. When the server port number of the UDP message is a Radius serving port (i.e., the UDP message is a Radius message), the second ID extracted by the distribution unit 812 is a Frame-IP-Address (i.e., the IP of the MS) therein. When the server port number of the UDP message is not a Radius serving port (that is, the UDP message is a non-Radius message), the second ID extracted by the distribution unit 812 is a source IP (i.e., the IP of the MS) therein. Afterwards, the distribution unit 812 determines whether there is a session having a key word same as the extracted Frame-IP-Address or source IP (i.e., the IP of the MS). If there is such a session, the UDP message is associated with the session, and the distribution unit 812 distributes the UDP message to the application node device corresponding to the session. Meanwhile, the backup unit 813 transmits the UDP message to the backup node device 83. If there is no such a session, there is no session associated with the UDP message, and the preprocessing unit 811 extracts the Frame-IP-Address or the source IP (i.e., the IP of the MS) from the UDP message based on the type of the UDP message. The extracted IP address of the MS is used as a key word to create a session, and a corresponding application node device is allocated to the created session. A timeout period may be set for the session. When the current session expires, a new session may be recreated for the subsequent IP message in this manner and a new application node device may be reselected.

UIDB 821 receives the Radius message transmitted from LB 81 and stores the session control information therein (for example, the MS online and offline information). WAP GW 822 receives a non-Radius message among UDP message or any other session traffic message (such as a TCP message) transmitted from LB 81, and stores the session traffic information therein.

The backup node device 83 may back up the session control information or session traffic information in the UDP message.

When WAP GW 822 searches for the session control information of a session, it transmits a search request for the session control information to UIDB 821. UIDB 821 responds to the search request with the locally stored session control information of the session. When WAP GW 822 fails to obtain the session control information from UIDB 821, it searches for the session control information of the session backed up in the backup node device 83.

Moreover, UIDB 821 may search WAP GW 822 for the session traffic information in other embodiments of the invention.

In the above embodiment, a session is held, a corresponding application node is allocated to the session, and different types of session messages may be distributed to the application node corresponding to the session based on the association between the different types of session messages and the session. Storage and retrieval of different types of session information may be achieved on the same application node. Different types of session information may be obtained more easily, and different types of session information may be distributed in a balanced manner. Smooth and dynamic capacity expansion may be achieved for the application node cluster, the system performance may be enhanced, and system maintenance may be facilitated.

Note that the bearer related to the above session control information may be a Radius message or a Diameter message. The session traffic corresponding to the session traffic information may involve IP applications such as the WAP application, the streaming media application, the Voice over Internet Protocol (VoIP) application, or the Peer to Peer (P2P) application.

Furthermore, those skilled in the art may appreciate that some or all steps of the method according to the above embodiments may be implemented by a program instructing the related hardware. The program may be stored in a computer readable storage media. When the program is executed, the steps of the above methods according to the various embodiments may be involved. The storage media may be a magnetic disk, an optic disc, a Read-Only Memory (ROM) or a Random Access Memory (RAM), etc.

Detailed descriptions have been made above to specific implementations of the invention. To those skilled in the art, various changes and improvements may be made without departing from the principle of the invention, and these changes and improvements are intended to fall within the scope of the invention.

What is claimed is:

1. A method for message distribution, comprising:
   extracting, by a load balance (LB) device, a first ID from a first type of session message, wherein the first ID is a terminal number of a first terminal transmitting or receiving the first type of session message;
   creating a session by using the first ID as a key word, and holding the session; allocating a cluster node corresponding to the session;
   distributing the first type of session message to a User Information Database (UIDB) in the cluster node corresponding to the session;
   upon receiving a second type of session message, extracting, by the LB device, a second ID from the second type of session message, wherein the first type of session message is a session control message and the second type of session message is a session traffic message;
   determining, according to the second ID, whether the second type of session message is associated with the session created by using the first ID, wherein the determining comprises:
      extracting a third ID from the first type of session message, the third ID being the IP address of the first terminal transmitting or receiving the first type of session message, and creating a correspondence relationship between the IP address and the terminal number;
      upon receiving the second type of session message, extracting the second ID from the type of session message, the second ID being the IP address of a second terminal transmitting or receiving the second type of session message;
      based on the correspondence relationship between the IP address and the terminal number, searching for a terminal number corresponding to the second ID;
      determining whether the found terminal number is same as the key word for creating the session; and
      if the found terminal number is same as the key word, associating the second type of session message with the session; and
   distributing the second type of session message to a Wireless Application Protocol (WAP) Gateway (GW) in the cluster node corresponding to the session when the second type of session message is associated with the session.

2. The method according to claim 1, wherein determining, according to the second ID, whether the second type of session message is associated with the session created by using the first ID comprises:

determining whether the second ID is same as the key word for creating the session; and
if the second ID is same as the key word, associating the second type of session message with the session.

3. The method according to claim 2, wherein the first ID is the Internet Protocol (IP) address of a first terminal transmitting or receiving the first type of session message and the second ID is the IP address of a second terminal transmitting or receiving the second type of session message.

4. The method according to claim 1, further comprising:
detecting whether the cluster node has a fault; and
if the cluster node has a fault, creating another session based on the second type of session message and allocating another corresponding non-fault cluster node to the session.

5. The method according to claim 1, further comprising:
transmitting at least one of the first type of session message and the second type of session message to a backup node that backs up the session information in at least one of the first type of session message and the second type of session message.

6. A load balance device, comprising:
a preprocessing unit configured to create a session based on a received first type of session message; allocate a corresponding cluster node to the session and distributing the first type of session message to a User Information Database (UIDB) in the cluster node corresponding to the session, wherein the first ID is a terminal number of a first terminal transmitting or receiving the first type of session message; and
a distribution unit configured to: upon receiving a second type of session message associated with the session, distribute the second type of session message to a Wireless Application Protocol (WAP) Gateway (GW) in the cluster node corresponding to the session, wherein the second ID is the IP address of a second terminal transmitting or receiving the second type of session message,
wherein the preprocessing unit comprises:
   a first extraction module configured to extract a first ID from the first type of session message;
   a creation module configured to create the session by using the first ID as a key word, and hold the session;
   an allocation module, configured to allocate a corresponding cluster node to the session and distributing the first type of session message to the UIDB in the cluster node corresponding to the session;
   a third extraction module configured to extract a third ID from the first type of session message, the third ID being the IP address of a first terminal transmitting or receiving the first type of session message; and
   a relationship module configured to create a correspondence relationship between the IP address of the first terminal transmitting or receiving the first type of message and the terminal number;
wherein the distribution unit comprises:
   a receiving module configured to receive a second type of session message, wherein the first type of session message is a session control message and the second type of session message is a session traffic message;
   a second extraction module configured to extract a second ID from the second type of session message;
   a determination module configured to determine, according to the second ID, whether the second type of session message is associated with the session created by using the first ID; and
   a transmission module configured to distribute the second type of session message associated with the session to the WAP GW in the cluster node corresponding to the session when the determination module determines that the second type of session message is associated with the session; and a searching module configured to: based on the correspondence relationship in the relationship module, search for a terminal number corresponding to the second ID; and wherein the determination module is configured to determine whether the terminal number is same as the key word for creating the session, wherein the second type of session message is associated with the session if the terminal number is same as the key word.

7. The device according to claim 6, wherein the determination module configured to determine whether the second ID is same as the key word for creating the session, wherein the second type of session message is associated with the session if the second ID is same as the key word.

8. The device according to claim 7, wherein the first ID is the IP address of a first terminal transmitting or receiving the first type of session message and the second ID is the IP address of a second terminal transmitting or receiving the second type of session message.

9. The device according to claim 6, further comprising:

a fault detection unit configured to detect whether the cluster node has a fault, and if the cluster node has a fault, trigger the preprocessing unit to create another session based on the second type of session message and allocate another corresponding non-fault cluster node to the session.

10. The device according to claim 6, further comprising:

a backup unit configured to transmit the first type of session message or the second type of session message to a backup node so as to back up the session information in the first type of session message or the second type of session message.

11. The device according to any one of claim 6, wherein the first type of session message is a session control message and the second type of session message is a session traffic message.

* * * * *